C. E. WHITE.
DISK HARROW.
APPLICATION FILED MAY 2, 1914.
1,247,765.
Patented Nov. 27, 1917.
2 SHEETS—SHEET 1.
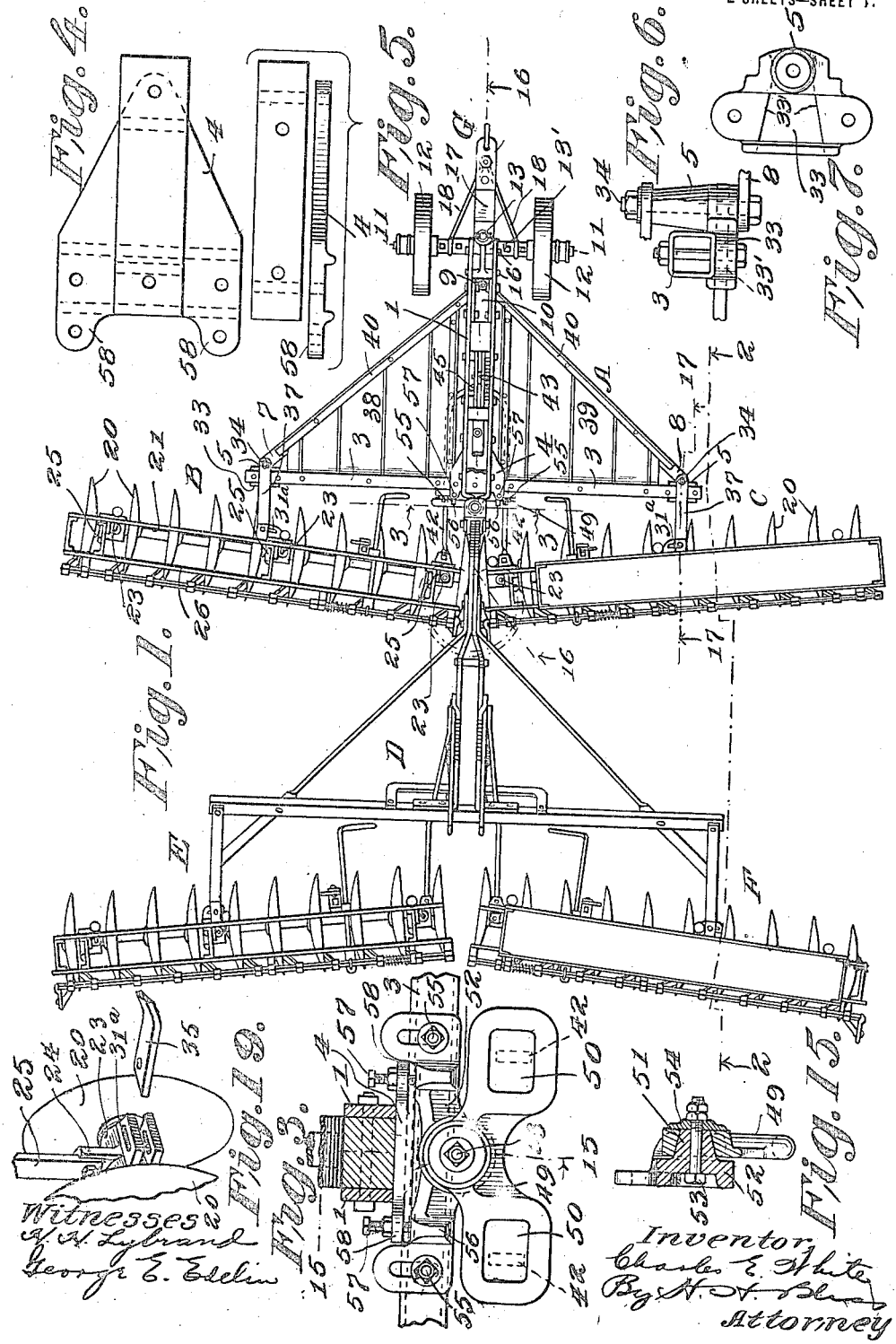
Witnesses
W. H. Lybrand
George E. Edelin
Inventor
Charles E. White
By H. A. Sl—
Attorney

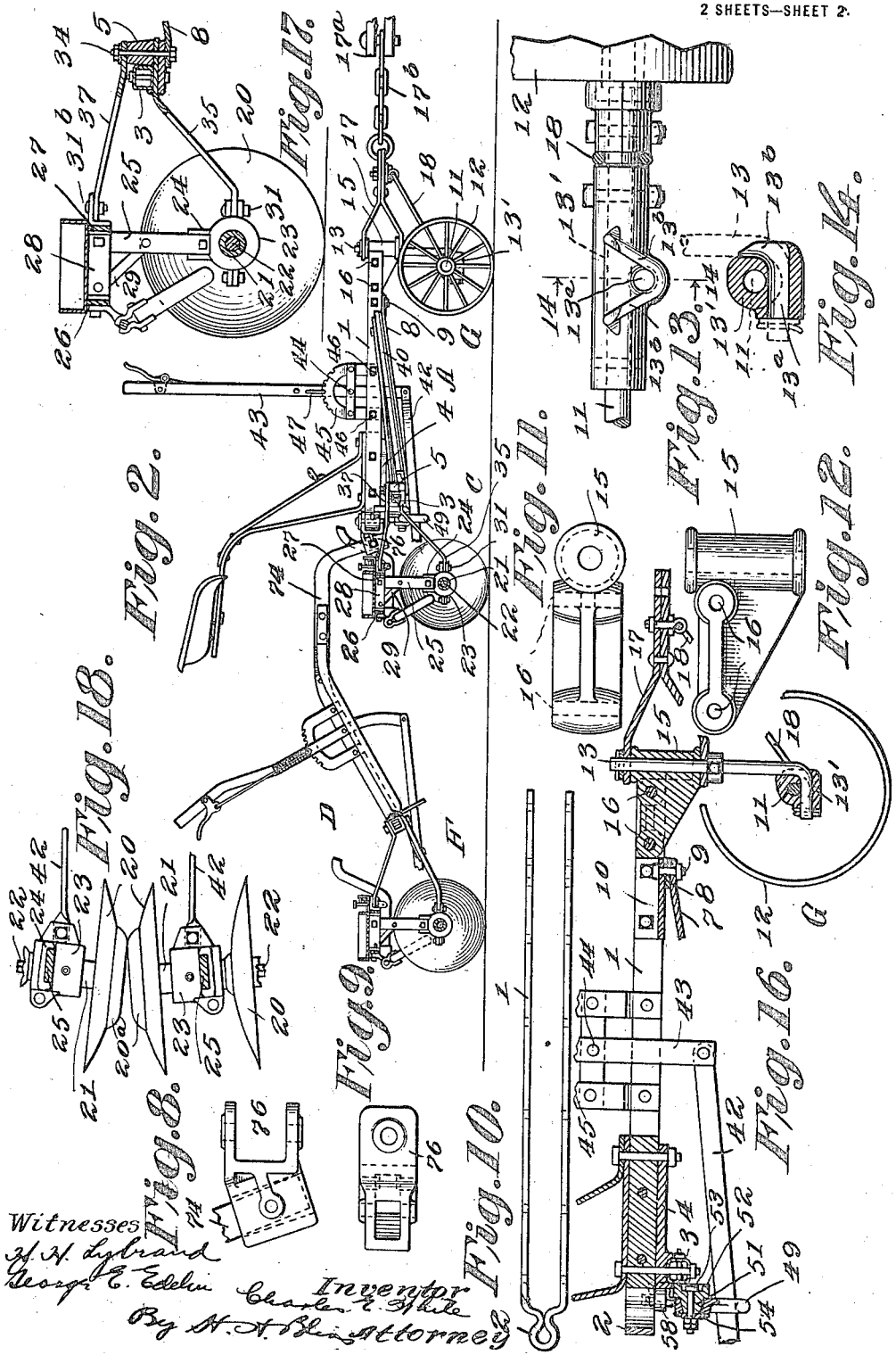

UNITED STATES PATENT OFFICE.

CHARLES E. WHITE, OF MOLINE, ILLINOIS, ASSIGNOR TO DEERE & MANSUR COMPANY, OF MOLINE, ILLINOIS, A CORPORATION OF ILLINOIS.

DISK HARROW.

1,247,765.  Specification of Letters Patent.  Patented Nov. 27, 1917.

Original application filed September 9, 1913, Serial No. 786,921. Divided and this application filed May 2, 1914. Serial No. 835,964.

*To all whom it may concern:*

Be it known that I, CHARLES E. WHITE, a citizen of the United States, residing at Moline, in the county of Rock Island and State of Illinois, have invented certain new and useful Improvements in Disk Harrows; and I do declare the following to be a full, clear, and exact description of the invention, such as will enable others skilled in the art to which it appertains to make and use the same.

This invention relates to improvements in disk harrows, and particularly to the draft frame positioned in front of the gang axles, its means of support, and the devices by which it is connected to, and guides, draws and controls the disk gangs.

Figure 1 is a plan view of a harrow implement embodying my improvements.

Fig. 2 is a vertical section on the line 2—2.

Fig. 3 is a transverse vertical section on the line 3—3 of Fig. 1.

Figs. 4 to 14, inclusive show details.

Fig. 15 is a vertical sectional view on the line 15—15 of Fig. 3.

Fig. 16 is a vertical sectional view on the line 16—16 of Fig. 1.

Figs. 17, 18 and 19, respectively, show other details.

In the drawings I have shown my improvements as embodied in an implement of the class known as double disking harrows.

It is not necessary, however, to describe in detail all of the parts used in constructing the rear disk gangs and the rear frame element.

Suffice it to say, as concerns the apparatus as an entirety, that A indicates the draft frame for the front section of the machine, it having the disk gangs B. and C. and D. indicating the draft frame of the rear section having the disk gangs E. and F.

Referring more particularly to the front element of the implement; its front frame A is formed of a centrally and longitudinally arranged stub-pole 1. 3, is a tubular cross bar secured to the pole by a base plate or casting, 4. There are diagonal braces extending from points near the front end of the stub pole 1 to the outer end of the cross bar 3 each brace being composed of a bar (7 or 8) These braces are secured by the bolts at 9 and the casting 10 to the pole, and by castings 5 they are secured to the ends of the cross bar. The central pole or draft bar 1 is formed of a flat metallic bar bent to provide a narrow elongated U having at its rear end a vertical bearing eye.

This draft pole 1 is, together with the other parts of the front frame, the draft elements which secure the frame to the disk gangs, and the other attachments, supported by the truck G. This is formed with a short axle 11, the two wheels 12, and the vertical post 13. The latter has at its lower end a journal 13ª loosely fitted in a bracket 13′ which, in turn, is fitted to the axle, and at its upper end is fitted in the sleeve bearing 15, bolted at 16 to the pole.

17 is a forked draft bar, its two arms engaging the post 13, one above and the other below the bearing sleeve 15 and resting upon a suitable support on the post.

18 is a brace formed of a bar or rod of metal bent into approximately V-shape and interposed between the axle bearing and the draft-bar 17, the apex part of the brace rod being fitted to the draft bar and extending downward toward the end parts of the axle to which it is connected in such way that when the draft turns the draw yoke 17 toward the right or the left the legs of the brace rod 18 will correspondingly swing the truck axle. The axle 11, wheels 12, and sleeve 13′ can rock around the journal 13ª, the rocking being limited by the lugs 13ᵇ which impinge on post 13 as a stop.

The draft frame has a flooring formed of corrugated metal sections 38, 39, secured in place by angle bars 40 riveted to the inclined braces 7 and 8.

Each disk gang B. and C. has a number of disks 20 with spools 21 and a connecting bolt or axle rod 22.

23 are the bearing boxes for each of the disk gangs, there being preferably 3. Some of these have flanges 24 with upright bars 25. These bars are, at the top secured to a frame having longitudinal bars 26 and 27 together with cross bars 28 and inclined braces 29. Each of the aforesaid castings 5 is formed with a vertical tubular part and with a box part at 33 having a flaring aperture or passageway 33′.

The part 8 of the diagonal frame brace is secured to the apertured part, see Figs. 6 and 7.

35 is a draft connection extending rearward from the casting 5, passing through the flaring passageway 33'. It is pivoted at its forward end by a pivot passing through the tubular part of the casting, the pivot being shown at 34. This bar 35 is connected to one of the draft boxes of a gang axle by a pin or bolt 31 joining it to a flange plate on the draft box, there being a slot at 31ᵃ for this pin.

Immediately above the bar 35 there is a companion bar 37 between the draft frame and the disk gang. It is pivotally connected to the upper bar 27 of the gang frame by a pivot pin 31ᵇ which is positioned at the axis of the slidable pin or bolt 31 arranged below it.

These draft bars 35 and 37 permit the gang axle to move endwise, inward and outward.

Under the pressure from the earth the gang axles are thrust toward and caused to bear against each other. To meet this pressure the innermost disks of the opposite gangs are provided with large buffing plates or bumpers 20ᵃ which are so constructed that they never pass entirely out of contact with each other no matter into what position the gangs may be adjusted or as to the extent which they may move vertically at their inner ends.

The gangs are arranged to be moved in such way as to have the outer ends situated farther forward than the rear ends when the machine is at work; that is to say, the gangs can be brought to a substantially straight transverse line or they can be brought to positions where they diverge forward from their inner ends. This is accomplished by means of the draw-bars 42, 42 each connecting the innermost bearing of one of the gangs to the lower end of the adjusting lever 43.

This lever is pivoted at 44 on the draft frame and has a locking detent 47, coöperating with a segment 45 bolted to the frame at 46.

I employ the device shown at 49 for transmitting the weight of the platform and the parts attached thereto, and of the driver when in position in the seat, to the disks of the gangs, and also to guide and retain the draw bars in position. This part 49 is a rocking yoke bar.

It is pivoted to a plate 52 by a tapered pintle 51, fitting in a tapered aperture and held by the bolt 53 and washer 54. This rocking bar has slots or apertures 50 through which the draws 42 pass loosely. The bar 49 bears downward, vertically upon the draw bars and prevents the inner ends of the gangs from rising beyond predetermined limits, but permitting oscillation of the draw-bars and the gang ends to the extent required.

The plate 52 has arms with vertical slots, and is fastened to frame bar 3 by the bolts 55. The above mentioned base plate or casting 4, which secures the draft pole 1 to the cross bar 3 also serves as an abutment for these parts 49 and 52. It has apertured ears 58 through which pass screws 57 provided with lock nuts which bear on the arms of the plate 52. 56, 56 are stop lugs which limit the movement of the yoke bar 49.

If the lock nuts and bolts at 55 be loosened, the screws 57 can be utilized to raise or lower the front frame relatively to the draw-bars and also to limit the play of the bars as is found necessary. After adjustment the parts are again locked by the bolts 55.

The vibratable yoke bar 49 is so arranged as not to interfere with the movements of the laterally swinging draft systems at 35, 37. If the drag bar of either disk gang be strained outward, its loop 50 in the yoke bar 49 permits outward movement, and the slotting of the holder of the pivot 31 will permit the gang axle to accommodate itself to any sudden longitudinal shifting of the gang. The axle and the bar 49 are in horizontal planes which are close together and strains are correspondingly reduced. The attachment of the upper draft bar 37 is not seriously interfered with by such movements under strain. The vertical edges of the loops 50 and bar 49 are so related to the pivots at 31 that there shall be a limit to the strain and the said pivot parts finally relieved.

The actions of the draft frame and of the disk gangs in relation to each other when meeting the varying conditions of work, if a front truck system, such as shown, is present, are materially different from the actions incident to the machines having the front parts supported upon the neck yokes of the teams. The elements of the front harrow shown can be regarded as having a ground base which is normally fixed horizontally in relation to the ground surface, it being supported upon two front wheels and two rolling systems at the rear. The latter have in and out movements longitudinally of their axes, limited vertical vibratory movements around transverse horizontal axes, and movements, under adjustment, around vertical axes intermediate of their ends. The frame and the wheels of the truck G can vibrate relatively to each other. And all of these parts are so related that, although rigidity for the purposes of draft is maintained, there is a relief from strains that would otherwise be caused by the varying conditions of the ground.

If the outer end of either gang moves relatively downward around a transverse line inside of the draft bars 35, 37, the side of the main frame tends to follow; at the same time the inner end of that gang tends to rise and swing down the opposite end of the yoke bar 49 simultaneously with a rocking of the draft frame on the front truck. This results in limited swinging movements of the gangs longitudinally of their axes, which are permitted by the slots for the pins at 31 and by the rocking bar 49, the upper supporting points of the bars 37 yielding sufficiently.

By varying the angle between the axes of the disk gangs B and C, the suction and depth of penetration of the disks can be varied to suit differing conditions. But the positions of the draft frame, in relation to the truck and the draft devices, should be maintained as nearly constant as possible, irrespective of the depth of cut of the disks. And this is made possible by the adjusting devices at 55, as the angles of the drag bars 42 to the horizontal planes of the draft frame can be varied to correspond to the angles of adjustment of the gangs to meet differing ground conditions.

I do not herein claim any of the features of construction which characterize the machine, when considered as an entirety, as one of the double disking class of harrows, having presented claims for those features in my application Serial No. 788,921, filed on the 9th day of September 1913; preferring the present application to present claims for the novel features of construction and arrangement which are embodied in the front draft frame, in the means which support it, the means which connect it to the front disk gangs, and the means by which their relative positions can be adjusted and maintained.

What I claim is:

1. The combination of the draft frame, the disk gangs arranged to both move longitudinally inward and to rock around horizontal axes transverse to their longitudinal axes and having either or both of their ends respectively movable forward and backward, draw-bars connected to the gang frame, means on the draft frame for moving the draw bars forward and backward, the vertically vibratable yoke bar engaging loosely vertically with the draw bars, the vertically adjustable holder for the yoke bar, and a base plate on the front draft frame adapted to carry the adjusting devices for the holder and to act as an abutment therefor.

2. The combination of the front gangs arranged to abut inward longitudinally and to rock vertically around horizontal axes transverse to their longitudinal axes, boxes for the disk gangs arranged at points between their ends, respectively, a front draft frame, swinging link draft bars between the draft frame and the gang boxes, forwardly extending draw bars each connected to the inner end of a gang axle, means for moving the drag bars simultaneously forward and backward longitudinally, and the vertically vibrating guiding and pressure yoke bar, engaging loosely vertically with the draw bars, the vertically adjustable carrier plate on the draft frame to which the yoke bar is pivoted, and the base plate above the carrier plate and supporting the devices for adjusting the carrier.

3. In a disk harrow, the combination of the main front frame to which the draft is applied, the base plate secured rigidly to the rear part of said frame, the oppositely arranged disk gangs, the draw bars for moving the inner ends of said gangs forward and backward, the vertically adjustable holder on the main frame and abutting against the said base plate, and the vertically oscillating yoke bar pivoted to and vertically adjustable with the said holder and loosely engaging vertically with the draw bars, substantially as set forth.

4. In a disk harrow, the combination of the front draft frame comprising the longitudinally arranged draft attaching element formed of a flat bar bent to a narrow U-shape, the base plate at the rear side of the draft frame, the rear cross bar rigidly secured to the base plate, the forward and inward inclined side bars, the casting for rigidly joining together the draft element and the front ends of the inclined side bars, and the castings each adapted to join rigidly together the rear cross bar and the rear end of an inclined side bar, the oppositely disposed disk gangs behind the draft frame, the drag bars at the inner ends of the gangs bearing loosely vertically on the draft frame, and the draft elements connected to the last said castings and loosely connected to the outer parts of the disk gangs.

5. In a disk harrow, the combination of the front draft frame, the vertically adjustable holder rigidly connected to the draft frame, the vertically vibrating yoke bar held bodily stationary, vertically, relatively to the frame but capable of vibrating at its ends, the disk gangs movable longitudinally inward and adapted to vibrate around horizontal axes transverse to their longitudinal axes and having their inner ends movable forward and backward, and draft bars connected to the inner ends of the gang frames and engaging loosely with the said vibratable yoke bar, all of said parts being arranged substantially as set forth whereby the frame is held as an entirety in approximately the same positions relative to the horizontal planes while the inner ends of the gangs are allowed to rise and fall.

6. The combination of the draft frame, the front truck having a longitudinal horizontal axis between the draft frame and the truck wheels, the disk gangs, the adjustable drag bars connected to the inner ends of the gangs, the vertically vibrating yoke bar bodily adjustable vertically and secured bodily rigidly to the rear end of the draft frame and loosely engaging with the drag bars to permit their longitudinal movement and their vibrating laterally and carrying positive stops for their lateral vibrations, the forwardly converging laterally swinging draft devices 35, 37, pivoted at a common fixed vertical axis to the draft frame, and hinged to the disk gangs at a common vertical axis by two vertically remote pivots, the lower of which permits longitudinal movement of the disk gangs, substantially as set forth.

7. The combination of the draft frame having the draft attaching element formed of a bar bent into a narrow elongated U-form, the base plate 4 rigidly connected to said draft element, the rear cross bar 3 rigidly connected to the base plate, the holder vertically adjustable on and secured rigidly in relation to the aforesaid parts and the vibrating yoke 49 pivoted to the said holder and adapted to loosely engage with the draw bars of the disk gangs.

8. In a disk harrow, the combination with the two oppositely disposed disk gangs, the pivoted draft bars connected with the outer parts of the gangs, and the truck frame, of the intermediate front draft frame formed of a longitudinally arranged central draft attaching element, the forward and inward inclined side bars secured at their rear ends rigidly to the rear cross bar and at their front ends secured rigidly to the draft element, and the corrugated metal sheets secured to the said rear cross bar and to the side inclined bars, the said draft frame having devices attached thereto for adjusting the inner ends of the disk gangs, and having fastening devices for the said draft elements connected to the outer parts of the disk gangs.

In testimony whereof I have hereunto set my hand in presence of two subscribing witnesses.

CHARLES E. WHITE.

Witnesses:
   O. F. LUNDAHL,
   N. A. PETERSON.